United States Patent
Kume (10) Patent No.: US 9,393,703 B2
(45) Date of Patent: Jul. 19, 2016

(54) UMBILICAL MEMBER ATTACHMENT DEVICE OF ROBOT

(71) Applicant: FANUC CORPORATION, Minamitsuru-gun, Yamanashi (JP)

(72) Inventor: Hirokazu Kume, Yamanashi (JP)

(73) Assignee: FANUC CORPORATION, Minamitsuru-Gun, Yamanashi (JP)

( * ) Notice: Subject to any disclaimer, the term of this patent is extended or adjusted under 35 U.S.C. 154(b) by 113 days.

(21) Appl. No.: 14/047,487

(22) Filed: Oct. 7, 2013

(65) Prior Publication Data

US 2014/0103168 A1    Apr. 17, 2014

(30) Foreign Application Priority Data

Oct. 12, 2012 (JP) ................. 2012-227209

(51) Int. Cl.
*B25J 19/00* (2006.01)
(52) U.S. Cl.
CPC ........ *B25J 19/0025* (2013.01); *Y10T 74/20311* (2015.01)
(58) Field of Classification Search
CPC ............... Y10T 74/20311; Y10T 74/20323; Y10T 74/20317; B25J 19/0025
USPC ............... 74/490.02, 490.03, 490.04; 901/21
See application file for complete search history.

(56) References Cited

U.S. PATENT DOCUMENTS

| | | | |
|---|---|---|---|
| 4,705,243 A * | 11/1987 | Hartmann et al. ............. 248/51 |
| 4,855,560 A | 8/1989 | Sonoda | |
| 5,437,207 A | 8/1995 | Zimmer | |
| 5,606,235 A | 2/1997 | Mauletti | |
| 5,881,604 A * | 3/1999 | Miwa .......................... 74/490.05 |
| 7,836,789 B2 * | 11/2010 | Haniya et al. .............. 74/490.06 |
| 7,979,160 B2 * | 7/2011 | Teaford et al. ................ 700/254 |
| 8,720,296 B2 * | 5/2014 | Yonehara et al. .......... 74/490.02 |
| 2003/0192390 A1 | 10/2003 | Uematsu | |
| 2005/0079007 A1 | 4/2005 | Katsuta | |
| 2005/0150123 A1 * | 7/2005 | Eaton ............................. 33/503 |
| 2006/0101937 A1 | 5/2006 | Salomonsson | |
| 2006/0117896 A1 | 6/2006 | Kidooka | |
| 2006/0196300 A1 | 9/2006 | Kidooka | |
| 2006/0258229 A1 | 11/2006 | Harada | |

(Continued)

FOREIGN PATENT DOCUMENTS

DE    3803502    9/1989
DE    9103497    8/1991

(Continued)

*Primary Examiner* — William Kelleher
*Assistant Examiner* — Emily Cheng
(74) *Attorney, Agent, or Firm* — RatnerPrestia (57) ABSTRACT

An umbilical member attachment device including a first umbilical member-use first fastening part and second fastening part respectively fastening a first umbilical member to a first member and second member, and a second umbilical member-use first fastening part and second fastening part respectively fastening a second umbilical member to a first member and second member. These fastening parts are arranged offset in position from each other on a surface of the robot so that the first umbilical member and the second umbilical member do not cross, and at a reference posture, and so that a distance between the first umbilical member-use second fastening part and the second umbilical member-use second fastening part becomes broader than a distance between the first umbilical member-use first fastening part and the second umbilical member-use first fastening part.

8 Claims, 9 Drawing Sheets

(56) References Cited

U.S. PATENT DOCUMENTS

| | | | |
|---|---|---|---|
| 2010/0162845 A1 | 7/2010 | Yonehara | |
| 2011/0252914 A1 | 10/2011 | Ibayashi | |
| 2012/0067157 A1* | 3/2012 | Suzuki et al. | 74/490.02 |

FOREIGN PATENT DOCUMENTS

| | | |
|---|---|---|
| DE | 69402405 | 7/1997 |
| DE | 10018773 | 10/2001 |
| DE | 20022990 | 8/2002 |
| DE | 60220186 | 1/2008 |
| DE | 602005005606 | 4/2009 |
| DE | 102011014150 | 10/2011 |
| JP | 08197482 | 8/1996 |
| JP | H11-239992 | 9/1999 |
| JP | 2011-161571 | 8/2011 |
| JP | 2012-061565 | 3/2012 |
| WO | WO 2009/069389 A1 | 6/2009 |

\* cited by examiner

FIG. 1A

PRIOR ART

FIG. 1B

PRIOR ART

FIG. 1C

PRIOR ART

FIG. 1D

PRIOR ART

UMBILICAL MEMBER ATTACHMENT DEVICE OF ROBOT

BACKGROUND OF THE INVENTION

1. Field of the Invention

The present invention relates to an umbilical member attachment device which attaches wires, tubes, or other umbilical members to a robot.

2. Description of the Related Art

In the past, a multiarticulated robot in which a plurality of umbilical members are laid in a flexible manner are known. In the robot described in, for example, International Publication No. WO2009/069389 (WO2009/069389A1), a plurality of umbilical members are divided into robot-use umbilical members required for driving the robot and tool-use umbilical members required for the gun, etc. which are attached to the front end of the robot. These are fastened by the clamps to moving parts of the robot which rotate relative to each other. Between a second top arm and a front arm, a support is provided sticking out from the base end of the front arm toward the back. Further, robot-use umbilical members and tool-use umbilical members are laid from a side surface of the second top arm to a side surface of the support while aligned in the front-back direction, and these are fastened by clamps to the side surface of the second top arm and side surface of the support.

Since the robot described in WO2009/069389A1 fastens the umbilical members to the side surface of a support which is provided sticking out from the base end of the front arm to the back, the fastening parts of the umbilical members on the side surface of the support easily become close. For this reason, in order to avoid contact between umbilical members when the front arm is moved, the umbilical members have to be laid while bent into predetermined shapes. Laying the umbilical members is therefore troublesome.

SUMMARY OF THE INVENTION

One aspect of the present invention is an umbilical member attachment device for attaching a plurality of umbilical members to a robot, the robot having a first member and a second member which rotate relative to each other about an axis of rotation, the first member and the second member being respectively provided along a first axial line and a second axial line which perpendicularly intersect the axis of rotation, the plurality of umbilical members including a first umbilical member and a second umbilical member, each of the first umbilical member and the second umbilical member having a moving part moveable between the first member and the second member. The umbilical member attachment device includes a first umbilical member-use first fastening part fastening one end of the moving part of the first umbilical member to the first member; a first umbilical member-use second fastening part fastening another end of the moving part of the first umbilical member to the second member, a second umbilical member-use first fastening part fastening one end of the moving part of the second umbilical member to the first member; and a second umbilical member-use second fastening part fastening another end of the moving part of the second umbilical member to the second member. The second umbilical member-use second fastening part is arranged at a base end of the second member, while the first umbilical member-use first fastening part, first umbilical member-use second fastening part, second umbilical member-use first fastening part, and second umbilical member-use second fastening part are respectively arranged offset in position from each other on a surface of one end side of the axis of rotation so that the first umbilical member and the second umbilical member do not cross. When the robot is at a reference posture where the first axial line and the second axial line perpendicularly intersect, the first umbilical member-use first fastening part and the second umbilical member-use first fastening part are arranged in proximity to each other across the first axial line, while the first umbilical member-use second fastening part and the second umbilical member-use second fastening part are arranged across the first axial line so that a distance between the first umbilical member-use second fastening part and the second umbilical member-use second fastening part becomes broader than a distance between the first umbilical member-use first fastening part and the second umbilical member-use first fastening part. The umbilical member attachment device further includes a device to which an end of the second umbilical member extending from the second umbilical member-use second fastening part are connected, between the first umbilical member-use second fastening part and the second umbilical member-use second fastening part.

BRIEF DESCRIPTION OF THE DRAWINGS

The object, features, and advantages of the present invention will become much clearer from the following explanation of embodiments given with reference to the attached drawings. In the attached drawings.

DETAILED DESCRIPTION

Figure 1A:
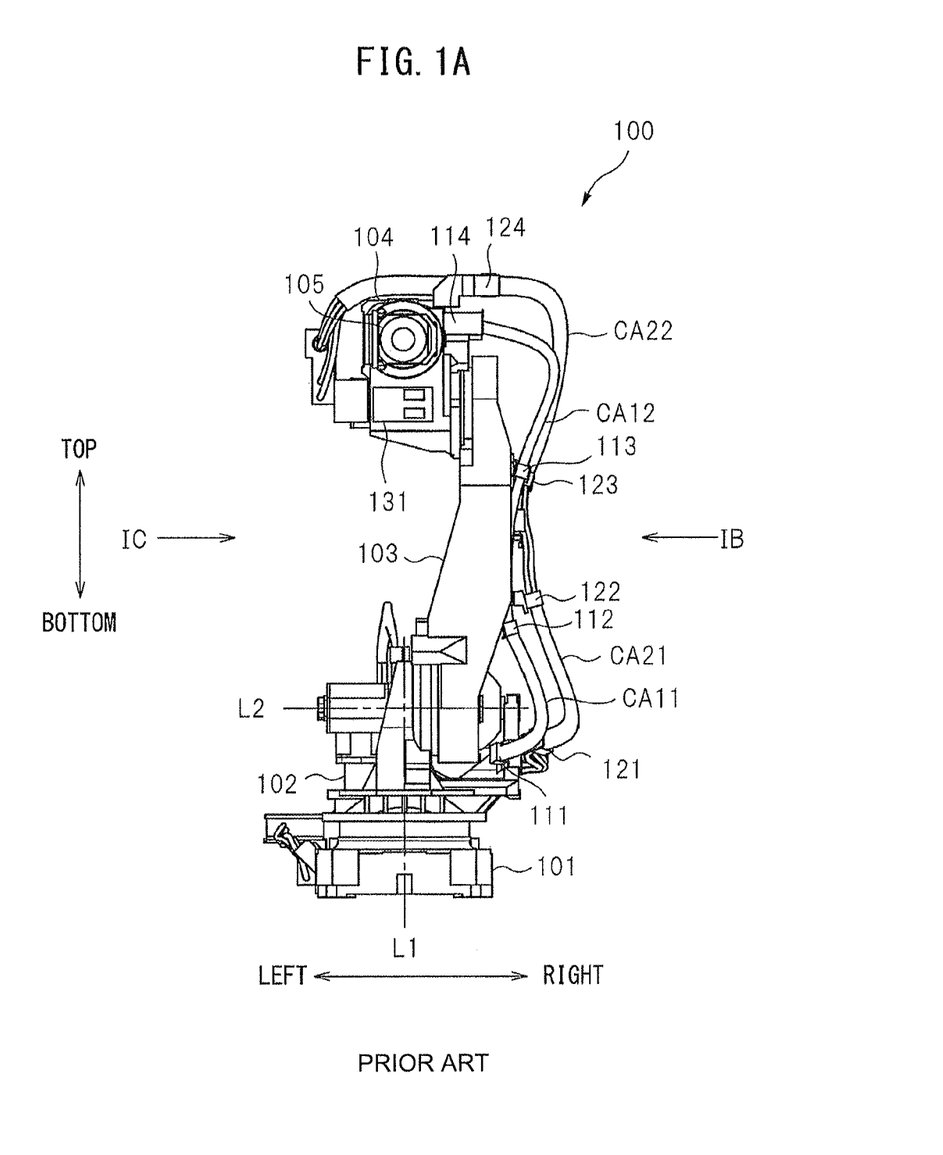
FIG. 1A is a front view which shows a basic configuration of a robot to which the present invention is applied.
Figure 1B:
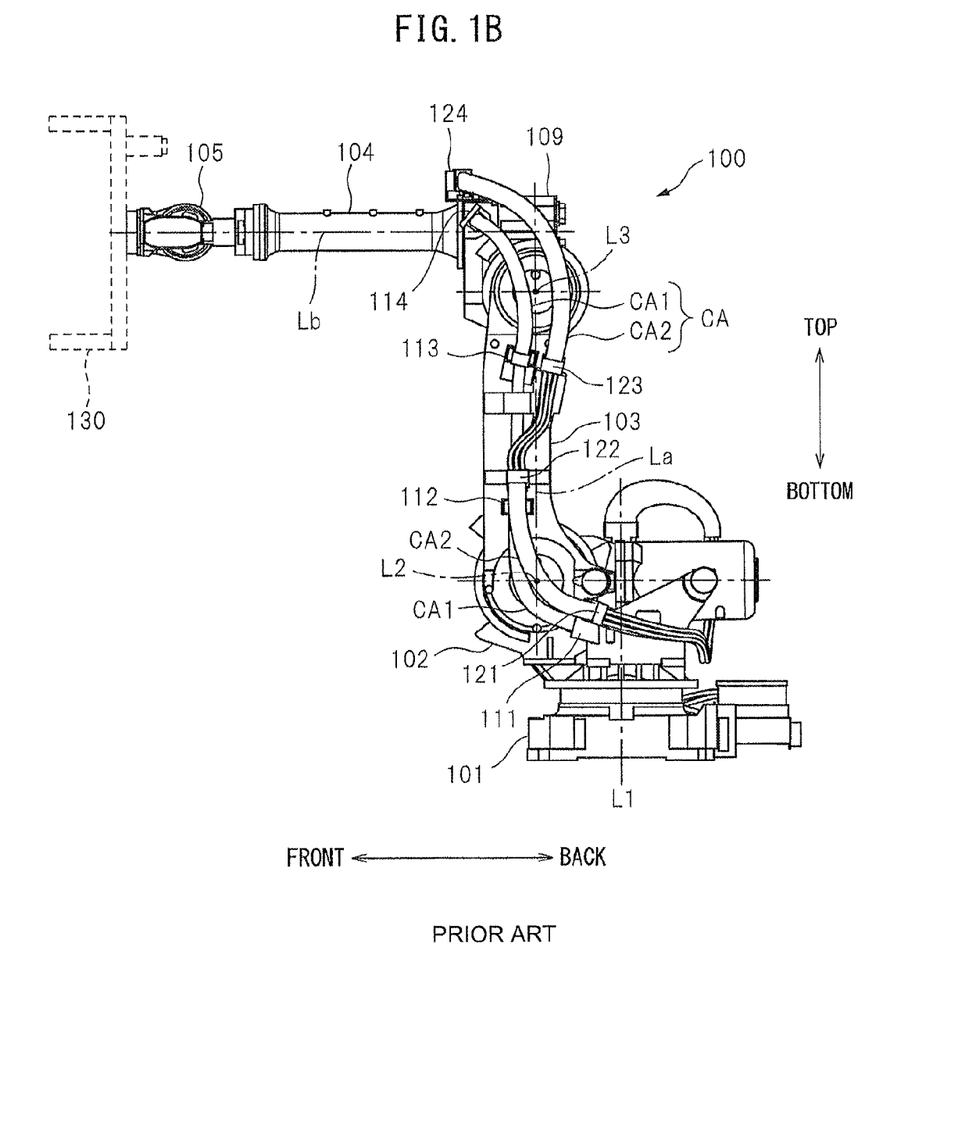
FIG. 1B is a right side view which shows a basic configuration of a robot to which the present invention is applied.
Figure 1C:
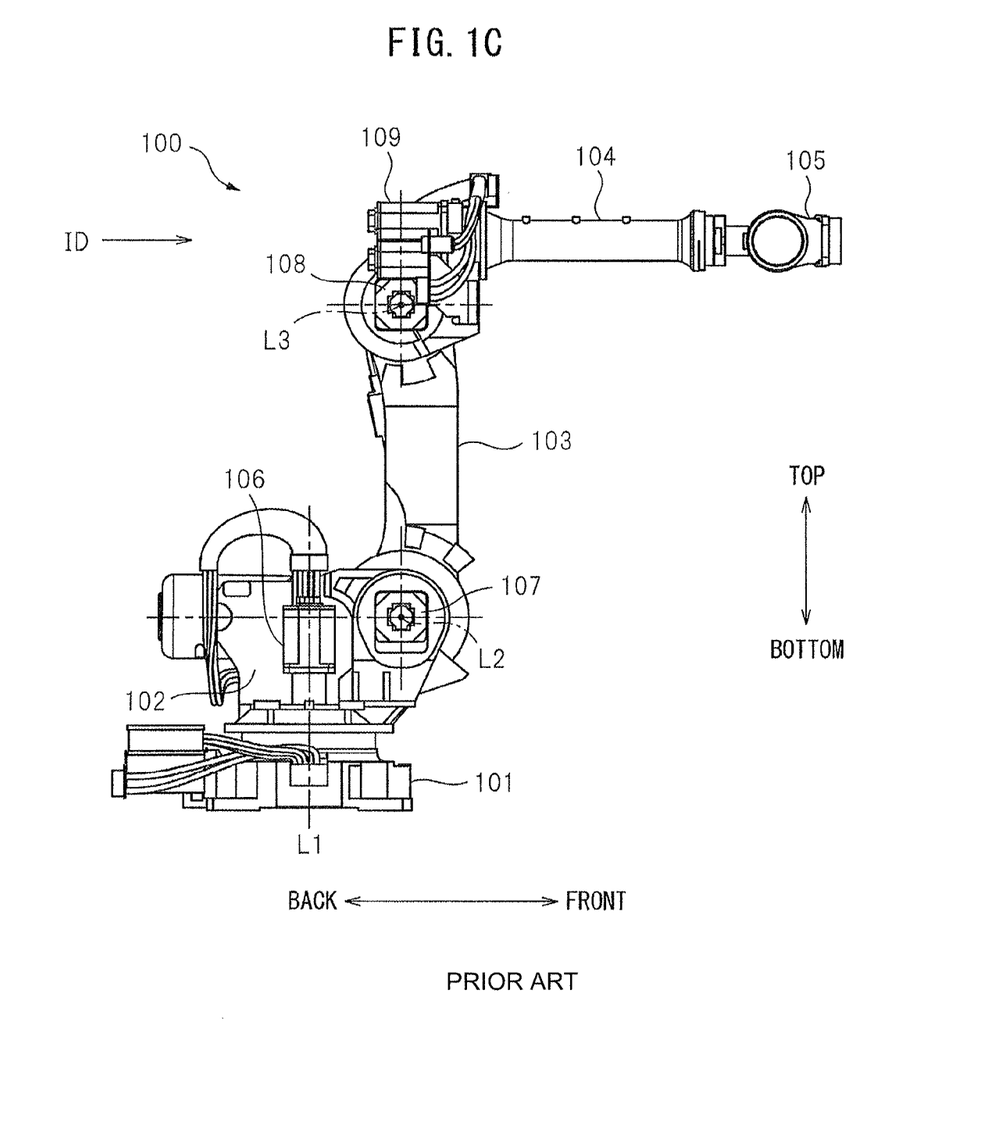
FIG. 1C is a left side view which shows a basic configuration of a robot to which the present invention is applied.
Figure 1D:
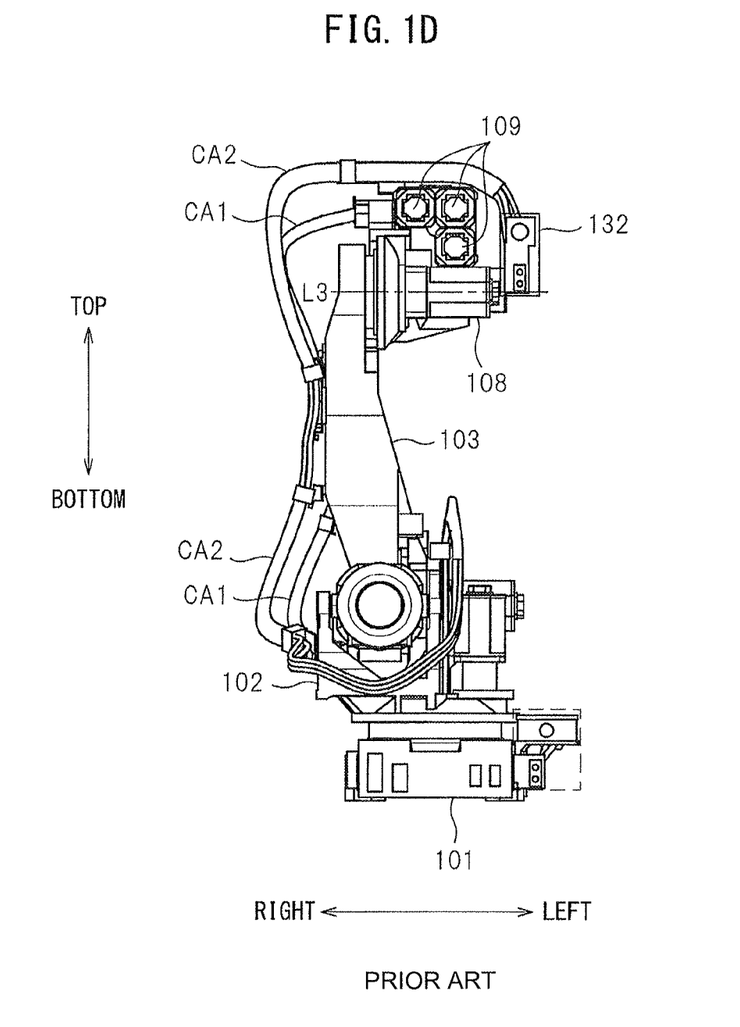
FIG. 1D is a back view which shows a basic configuration of a robot to which the present invention is applied.

Below, referring to FIG. 1A to FIG. 9, an umbilical member attachment device according to an embodiment of the present invention will be explained. First, the basic configuration of a robot to which the umbilical member attachment device according to the present embodiment is applied will be explained. FIG. 1A to FIG. 1D are views which show the configuration of an industrial robot 100 according to an embodiment of the present invention. In particular, FIG. 1A is a front view of a robot 100, FIG. 1B is a right side view of the robot 100 (view along arrow IB of FIG. 1A), FIG. 1C is a left side view of the robot 100 (view along arrow IC of FIG. 1A), and FIG. 1D is a back view of the robot 100 (view along arrow ID of FIG. 1C). The robot 100 of FIG. 1A to FIG. 1D is provided with an umbilical member attachment device of a comparative example of the present embodiment. Below, the posture of the robot 100 which is illustrated will be used as a reference (reference posture) to define the front-back direction, left-right direction, and top-bottom direction of the robot 100 as illustrated for convenience.

As shown in FIG. 1A to FIG. 1D, the robot 100 has a base 101, a swivel 102 which is provided above the base 101 which can swivel about an axial line L1 extending in a vertical direction, a bottom arm 103 which is supported rotatably at the swivel 102 about an axial line L2 extending in a horizontal direction, a top arm 104 which is supported rotatably at a front end of the bottom arm 130 about an axial line L3 extending in the horizontal direction, and a wrist part 105 which is provided at the front end of the top arm 104. As shown in FIG. 1B, at the reference posture, the bottom arm 103 extends along a first axial line La in the vertical direction, while the top arm 104 extends along a second axial line Lb in the horizontal direction. Therefore, the first axial line La perpendicularly intersects the axial line L3, while the second axial line Lb perpendicularly intersects the first axial line La.

As shown in FIG. 1A to FIG. 1D, the swivel 102 mounts a servo motor 106 along the axial line L1. The swivel 102 is driven by the servo motor 106 to swivel with respect to the base 101. The swivel 102 mounts a servo motor 107 along the axial line L2. The bottom arm 103 is driven by the servo motor 107 to swing with respect to the swivel 102 in the front-back direction. At the base end of the top arm 104, a servo motor 108 is mounted along the axial line L3. The top arm 104 is driven by the servo motor 108 to swing with respect to the bottom arm 103 in the front-back direction. At the base end of the top arm 104, a plurality of (in the figure, three) servo motors 109 are mounted. The wrist part 105 is driven by these servo motors 109 to operate. The servo motors 106 to 109 are robot drive motors.

The wrist part 105 has various end effectors 130 attached to it in accordance with the nature of the work. FIG. 1B shows an example of the end effector 130 by a broken line. While not shown, the cables to the end effector 130 of the top arm 104 and cable laying devices and relay boxes, etc. are together referred to as the "end effector 130".

The robot 100 has a plurality of umbilical members CA laid from the base 101 to the swivel 102, bottom arm 103, and top arm 104. The umbilical members CA are the general term for wires, tubes, etc. and include power lines and various signal wires to the servo motors 106 to 109 and other wires, and tubes for feeding liquids or gases, etc.

The umbilical members CA can be classified into a plurality of basic cables CA1 (hereinafter, referred to as "the first umbilical members") which include power lines and signal wires which correspond to the robot drive servo motors 106 to 109 and power lines and signal wires used for driving the end effectors, and a plurality of option cables CA2 (hereinafter, referred to as "the second umbilical members") which include cooling water feed hoses, cooling water return hoses, air feed hoses, and weld power cables.

These plurality of first umbilical members CA1 and plurality of second umbilical members CA2 are respectively bundled together to obtain a first cable bundle and a second cable bundle which are laid in the robot 100. At that time, the umbilical members CA1 and CA2 are laid deformably by flexing or deformably by twisting at the moving parts of the robot 100 at the mount of the base 101, the mount of the swivel 102, the mount of the bottom arm 103, the mount of the top arm 104, and other sections to keep from being excessively tensed at the time of operation of the robot 100.

That is, as shown in FIG. 1B, the first umbilical members CA1 are fastened at a fastening part 111 of the swivel 102, a fastening part 112 and fastening part 113 of the bottom arm 103, and a fastening part 114 of the top arm 104 on the right surface of the robot 100. The second umbilical members CA2 are fastened at a fastening part 121 of the swivel 102, a fastening part 122 and fastening part 123 of the bottom arm 103, and a fastening part 124 of a top arm 104 on the right surface of the robot 100.

The first umbilical members CA1 are fastened at the fastening part 114, and then are connected to the distribution board 131 (FIG. 1A). The second umbilical members CA2 are fastened at the fastening part 124, and then are run over the top arm 104 and are connected to the distribution board 132 (FIG. 1D) which is provided at the left side surface of the top arm 104. Part of the umbilical members CA are branched off midway and are connected to the servo motors 106 to 109.

As shown in FIG. 1A, the sections between the fastening part 111 of the swivel 102 and the fastening part 103 of the bottom arm 103 and the sections between the fastening part 113 of the bottom arm 103 and the fastening part 114 of the top arm 104 are respectively the moving parts CA11 and CA12 of the first umbilical members CA1. Further, the sections between the fastening part 121 of the swivel 102 and the fastening part of the bottom arm 103 and the sections between the fastening part 123 of the bottom arm 103 and the fastening part 124 of the top arm 104 are the moving parts CA21 and CA22 of the second umbilical members CA2.

In the example of FIG. 1A to FIG. 1D, the fastening part 122 of the second umbilical members CA2 is arranged at the right of the fastening part 112 of the first umbilical members CA1, so the amount by which the second umbilical members CA2 stick out to the right becomes greater. Further, the second umbilical members CA2 are arranged running above the top arm 104, so the amount by which the second umbilical members CA2 stick up also becomes greater. At the top part of the bottom arm 103, the first umbilical members CA1 and the second umbilical members CA2 are arranged aligned in the front-back direction. However, the fastening part 113 and fastening part 123 are close to each other, and the fastening part 114 and fastening part 124 are close to each other. Therefore, when the robot is moved, the first umbilical members CA1 and the second umbilical members CA2 may interfere.

Therefore, in the present embodiment, in order to keep down the amount by which the umbilical members CA stick out and in order to prevent interference between umbilical members at the moving parts CA11 and CA21 and the moving parts CA12 and CA22, the umbilical member attachment device is configured as follows. Although the umbilical member attachment device according to the present embodiment can be provided at various moving parts of the robot 100, below, in particular, the configuration of an umbilical member attachment device which is provided at a base end side moving part of the top arm 104 will be explained. The configuration of the robot 100 other than the umbilical member attachment device is the same as that which is shown in FIG. 1A to FIG. 1D.

Figure 2:
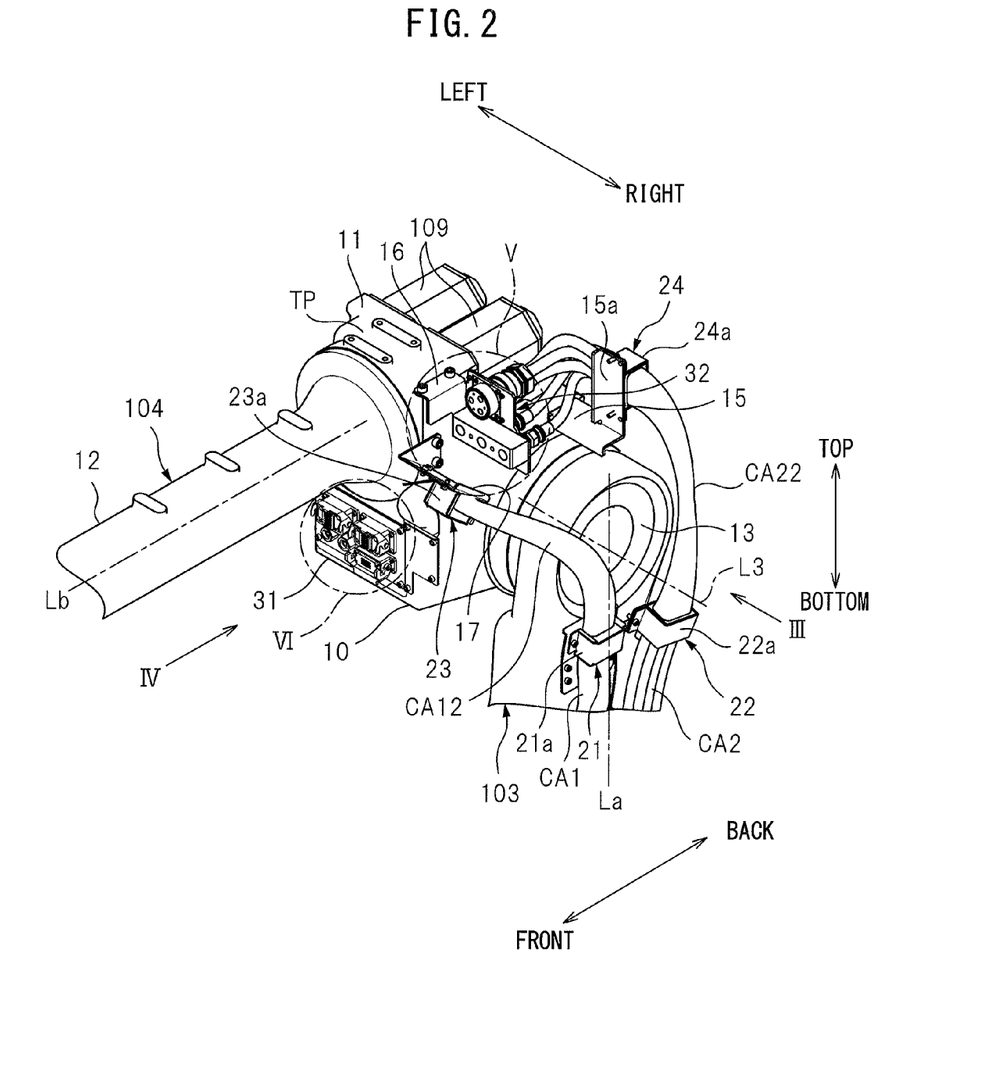
FIG. 2 is a perspective view which shows the configuration of main parts of an umbilical member attachment device according to an embodiment of the present invention.
Figure 3:
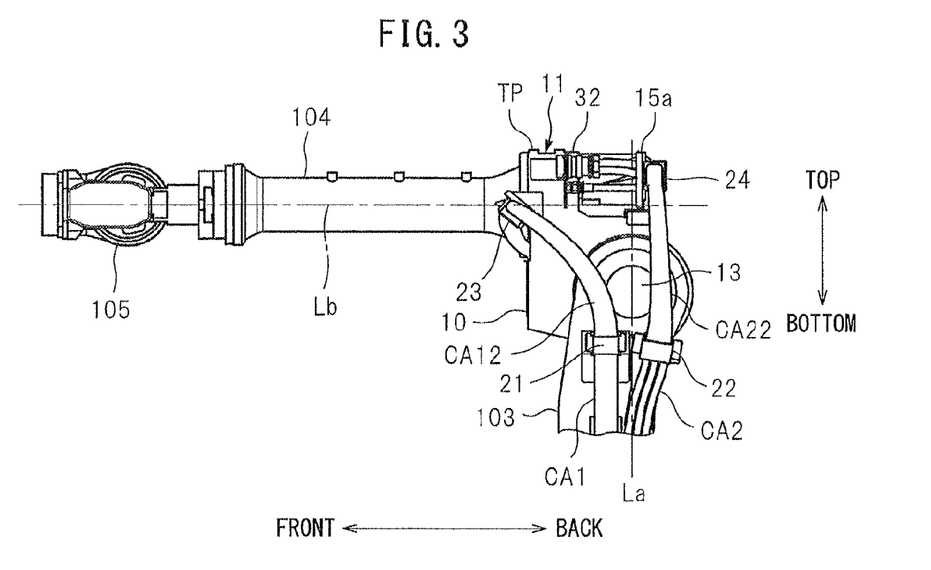
FIG. 3 is a view along an arrow III of FIG. 2.
Figure 4:
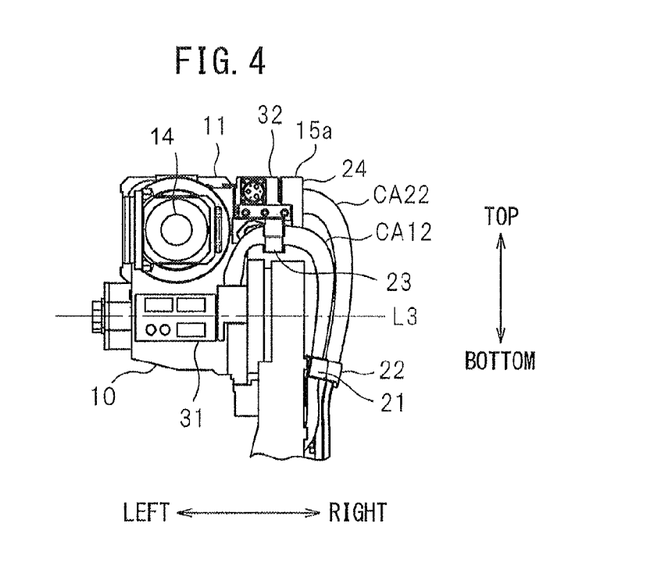
FIG. 4 is a view along an arrow IV of FIG. 2.

FIG. 2 is a perspective view which shows the principal configuration of an umbilical member attachment device according to the present embodiment (view of base end of top arm 104 at reference posture as seen from a slant in the top and right), FIG. 3 is a view along an arrow III of FIG. 2 (right side view), and FIG. 4 is a view along an arrow IV of FIG. 2 (front view).

As shown in FIG. 2 to FIG. 4, the top arm 104 has an arm part 12 which extends along a second axial line Lb and a substantially box shaped casing 10 which is provided at a back end of the arm part 12. At the top end of the casing 10, an arm support part 11 is provided. At the back end of the arm support part 11, servo motors 109 are arranged in the front-back direction. At the front end of the arm support part 11, the arm part 12 is supported. The right side surface of the casing 10 faces the left side surface at the top end of the bottom arm 103. Between the casing 10 and the bottom arm 103, a shaft part 13 (FIG. 2) extends along the axial line L3 and shaft part 14 (FIG. 4) extends along axial line Lb. Due to the shaft part 13, the top arm 104 is supported rotatably at the bottom arm 103. The top end of the bottom arm 103 is formed to an arc shape about the axial line L3.

At the right side surface of the bottom arm 103, directly below the shaft part 13, a bottom fastening part 21 which fastens the first umbilical members CA1 (corresponding to fastening part 113 of FIG. 1B) and a bottom fastening part 22 which fastens the second umbilical members CA2 (corresponding to fastening part 123 of FIG. 1B) are respectively attached. The bottom fastening parts 21 and 22 have U-shaped cross-section holders 21a and 22a which hold the first umbilical members CA1 and the second umbilical members CA2 respectively at the right side surface of the bottom arm 103. The umbilical members CA1 and CA2 run through the holders 21a and 22a in the top-bottom direction.

As shown in FIG. 3, the pair of bottom fastening parts 21 and 22 are arranged at the same heights in the top-bottom direction and in proximity in the front-back direction across the first axial line La. The second umbilical members CA2 are arranged at the back of the first umbilical members CA1. While not shown, the other fastening parts below the bottom fastening parts 21 and 22 (fastening parts corresponding to fastening parts 111, 112, 121 and 122 in FIG. 1B) are also arranged so that the second umbilical members CA2 are positioned at the back of the first umbilical members CA1. Due to this, the first umbilical members CA1 and the second umbilical members CA2 are laid, without crossing each other, along the right side surface of the robot 100 from the swivel 102 to the bottom fastening parts 21 and 22.

As shown in FIG. 2, at the right side surface of the arm support part 11, brackets 15 to 17 are provided sticking out toward the space above the bottom arm 103. The bracket 17 is provided with a top fastening part 23 which fastens the first umbilical members CA1. The bracket 15 at the back of the bracket 17 is provided with a top fastening part 24 which fastens the second umbilical members CA2. The bracket 16 at the front of the bracket 15 is provided with a second distribution board 32 to which ends of the second umbilical members CA2 are connected. Any two or all of the brackets 15 to 17 may be formed integrally.

The bracket 15 has a plate part 15a which extends upward from the back end, while the top fastening part 24 for the second umbilical members is attached to the back end face of the plate part 15a at the back from the first axial line La (see FIG. 3). The top fastening part 24 has a U-shaped cross-section holder 24a which holds and fastens the second umbilical members CA2 at the plate part 15a. The second umbilical members CA2 which run through the bottom fastening part 22 are bent toward the left while extending upward and run through the holder 24a in the left-right direction. These bent parts of the second umbilical members CA2 form the moving part CA22. The plurality of second umbilical members CA2 which pass through the top fastening part 24 are unbundled, bent forward in that state, and connected to the second distribution board 32.

Figure 5:
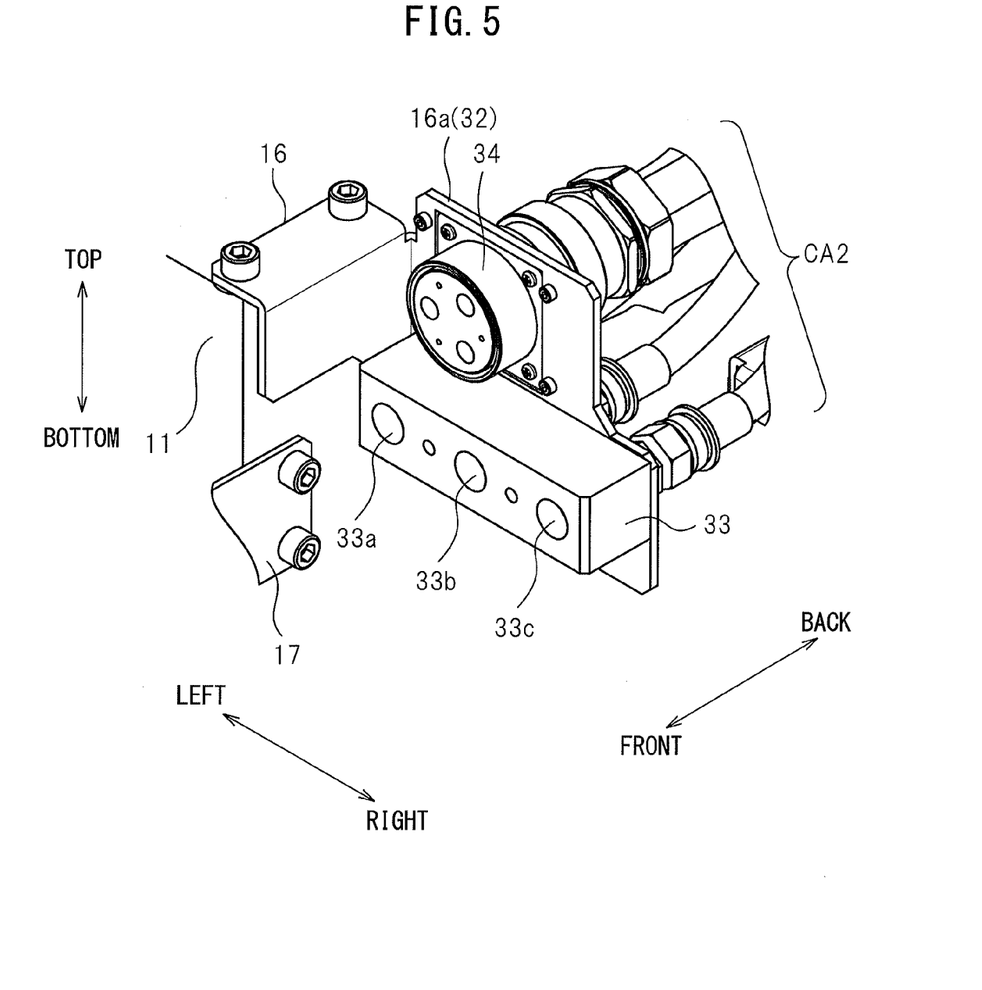
FIG. 5 is an enlarged view of a part V of FIG. 2.

FIG. 5 is an enlarged view of a part V of FIG. 2 which shows the second distribution board 32 enlarged. As shown in FIG. 5, the bracket 16 has a plate part 16a which extends in front of the first axial line La from the right side surface of the arm support part 11 to the right and top-bottom direction. This plate part 16a forms the second distribution board 32. At the front surface of the second distribution board 32, a manifold 33 is attached. Above the manifold 33, a connector 34 is attached. The manifold 33 is formed with, for example, a threaded part 33a to which a cooling water feed hose is to be connected, a threaded part 33b to which a cooling water return hose is to be connected, and a threaded part 33c to which an air feed hose is to be connected. The connector 34 is, for example, a connector for weld power cables.

The front ends of the second umbilical members CA2 are connected to the back surface of the second distribution board 32. Due to this, the second umbilical members CA2 are connected through the second distribution board 32 to the threaded parts 33a to 33c and connector 34. While not shown, to the threaded parts 33a to 33c and connector 34, hoses and cables are connected. These hoses and cables are, for example, laid along the top arm 104 up to the front wrist part 105.

The bracket 17 for the top fastening part 23 is attached below the bracket 16 and extends at the front bottom of the bracket 16 from the arm support part 11 to the right. As shown in FIG. 2, the front surface of the bracket 17 is inclined slanted downward. At the inclined surface, the top fastening part 23 of the first umbilical members CA1 is attached. The top fastening part 23 has a U-shaped cross-section holder 23a which holds and fastens the first umbilical members CA1 at the bracket 17. The first umbilical members CA1 which run through the bottom fastening part 21 extend upward while being bent toward the front and left and run through the holder 23a in the left-right direction. The bent parts of the first umbilical members CA1 form the moving parts CA12.

At the front surface of the casing 10, the first distribution board 31 is attached below the arm part 12. The plurality of first umbilical members CA1 which run through the top fastening part 23 are bent downward and further are guided inside of the left casing 10. While not shown, in the casing 10, the first umbilical members CA1 are unbundled and connected to the first distribution board 31.

Figure 6:
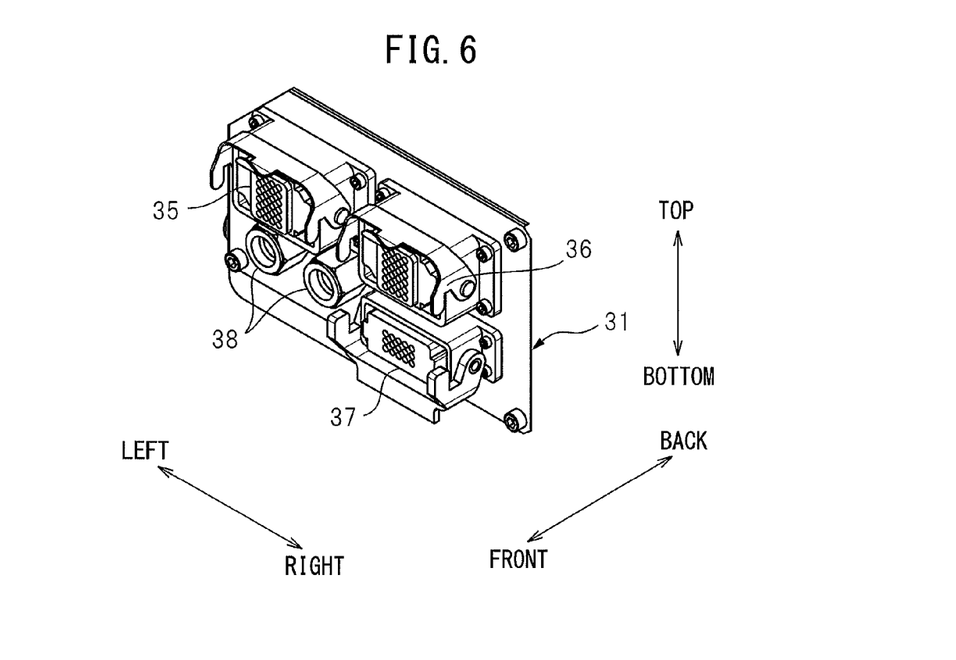
FIG. 6 is an enlarged view of a part VI of FIG. 2.

FIG. 6 is an enlarged view of the part VI of FIG. 2 which shows the first distribution board 31 enlarged. At the front surface of the first distribution board 31, connectors 35 and 36 are attached aligned in the left-right direction. Below the connector 36, a connector 37 is attached. Below the connector 35, a pair of left and right couplings 38 are provided. The connectors 35 to 37 are, for example, a connector which connects a signal wire for an end effector, a connector which connects a signal wire for an end effector drive motor, and a connector which connects a power line for an end effector drive motor. The couplings 38 are, for example, air couplings.

The front ends of the first umbilical members CA1 are connected to the back surface of the first distribution board 31. Due to this, the first umbilical members CA1 are connected through the first distribution board 31 to the connectors 35 to 37 and couplings 38. While not shown, to the connectors 35 to 37 and couplings 38, cables and hoses are connected. These cables and hoses are, for example, laid along the top arm 104 up to the front wrist part 105.

In the thus configured umbilical member attachment device, as shown in FIG. 3, in the reference posture of the robot 100, the bottom fastening part 21 and the top fastening part 23 of the first umbilical members CA1 are positioned at the front of the first axial line La, while the bottom fastening part 22 and the top fastening part 24 of the second umbilical members CA2 are positioned at the back of the first axial line La. The bottom fastening parts 21 and 22 are positioned aligned in the front-back direction in proximity to each other. As opposed to this, the front-back direction position of the top fastening part 23 is substantially equal to the position of the front end face of the casing 10. The top fastening part 24 is positioned at the back end of the top arm 104. For this reason, the front-back distance between the pair of the top fastening parts 23 and 24 is greater than the front-back distance between the pair of bottom fastening parts 21 and 22, while the first umbilical members CA1 and the second umbilical members CA2 are laid in an approximately V-shape upward when seen by a side view. Between the pair of the top fastening parts 23 and 24, the second distribution board 32 is arranged.

The topmost part of the robot 100 at the reference posture is the top end face TP of the arm support part 11 of the top arm 104. The top fastening parts 23 and 24, first distribution board 31, and second distribution board 32 are positioned below this top end face TP. The positions of the top fastening part 24 and the second distribution board 32 in the top-bottom direction are substantially equal to each other. The top fastening part 23 is positioned lower than the top fastening part 24 and second distribution board 32. As shown in FIG. 4, the first distribution board 31 is further below the top fastening part 23 and is positioned in the space below the arm part 12. The top fastening parts 23 and 24 and the second distribution board 32 are positioned at the right side of the top arm 104, while the first distribution board 31 is positioned at the center part of the top arm 104 in the left-right direction.

Figure 7A:
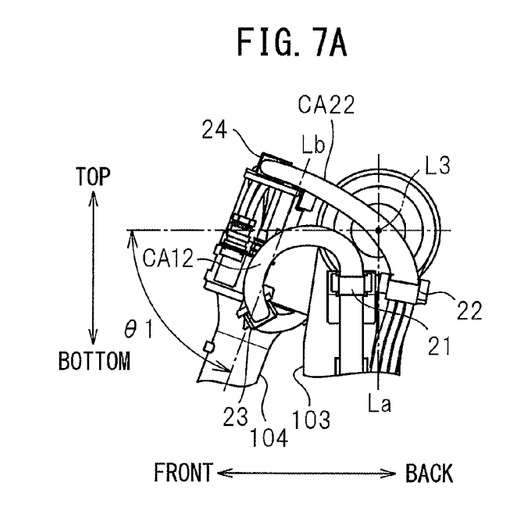
FIG. 7A is a right side view in a maximum descent state of the top arm.
Figure 7B:
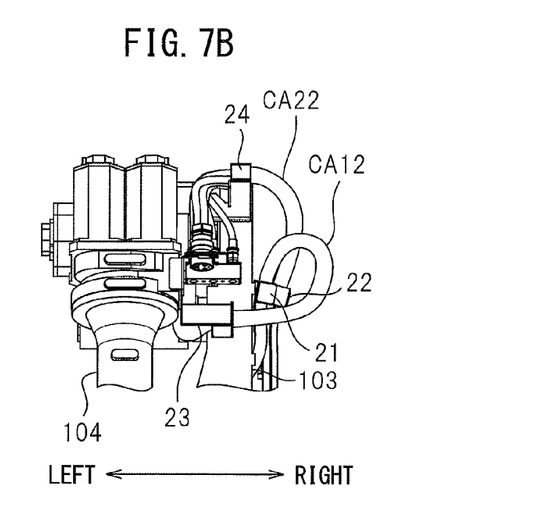
FIG. 7B is a front view in a maximum descent state of the top arm.
Figure 8A:
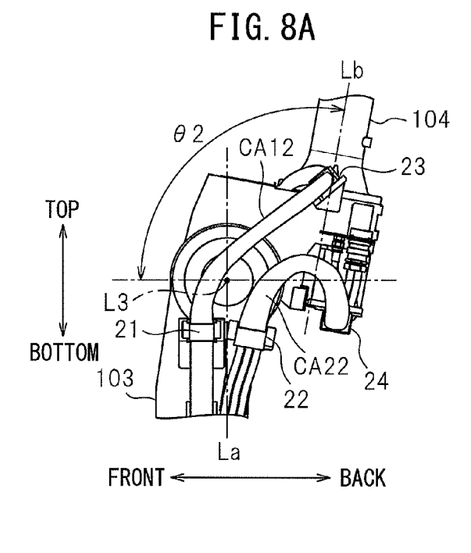
FIG. 8A is a right side view in a maximum ascent state of the top arm.
Figure 8B:
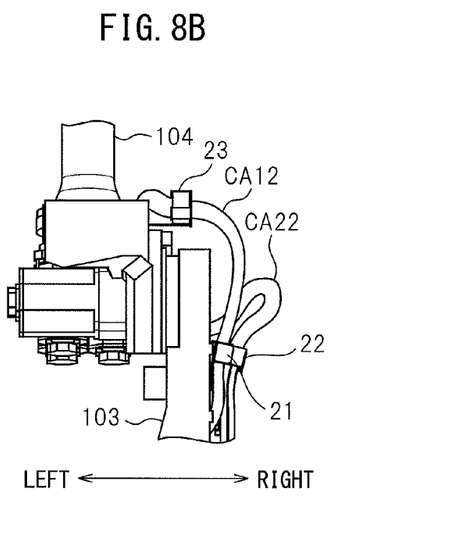
FIG. 8B is a front view in a maximum ascent state of the top arm.

Next, the operation of the robot 100 which has the umbilical member attachment device according to the present embodiment will be explained. FIG. 7A and FIG. 7B are respectively a right side view and a front view of the vicinity of the base end of the top arm 104 when making the top arm 104 descend from the reference posture by a predetermined angle θ1 (for example 70°). FIG. 8A and FIG. 8B are respectively a right side view and a front view of the vicinity of the base end of the top arm 104 when making the top arm 104 ascend from the reference posture by a predetermined angle θ2 (for example 100°). θ1 and θ2 are respectively the maximum descent angle and maximum ascent angle of the top arm 104 from the horizontal.

As shown in FIG. 7A, at the maximum descent state of the top arm 104, the bending radius of the moving parts CA12 of the first umbilical members CA1 is small while the bending radius of the moving parts CA22 of the second umbilical members CA2 becomes large. Further, as shown in FIG. 7B, the amount by which the moving parts CA12 of the first umbilical members CA1 stick out to the right becomes large, while the amount by which the moving parts CA22 of the second umbilical members CA2 stick out to the right becomes small.

As opposed to this, at the maximum ascent state of the top arm 104, as shown in FIG. 8A, the bending radius of the moving parts CA12 of the first umbilical members CA1 is large while the bending radius of the moving parts CA22 of the second umbilical members CA2 becomes small. Further, as shown in FIG. 8B, the amount by which the moving parts CA12 of the first umbilical members CA1 stick out to the right becomes small, while the amount by which the moving parts CA22 of the second umbilical members CA2 stick out to the right becomes large.

In this way, at the maximum descent state and maximum ascent state of the top arm 104, the bending radii and amounts of sticking out of the moving parts CA12 and CA22 of the umbilical members CA1 and CA2 change. However, whatever the case, the moving parts are sufficiently separated and the two do not interfere with each other. While not shown, even in the process of change from the maximum descent state to the maximum ascent state, in the same way, the moving parts are sufficiently separated and the two do not interfere with each other. Due to this, the umbilical members CA1 and CA2 can be extended in lifetime.

According to the present embodiment, the following actions and effects can be exhibited:

(1) The umbilical member attachment device of the present embodiment has a bottom fastening part 21 and a top fastening part 23 which respectively fasten one ends and the other ends of the moving parts CA12 of the first umbilical members CA1 to the bottom arm 103 and top arm 104, and a bottom fastening part 22 and a top fastening part 24 which respectively fasten one ends and the other ends of the moving parts CA22 of the second umbilical members CA2 to the bottom arm 103 and top arm 104 (FIG. 3). Further, these fastening parts 21 to 24 are arranged offset in position from each other on the right side surface of the robot 100 so that the first umbilical members CA1 and the second umbilical members CA2 do not cross, and the top fastening part 23 and the top fastening part 24 are arranged in the front-back direction across the first axial line La so that the distance between the top fastening parts 23 and 24 at the reference posture of the robot 100 becomes larger than the distance between the bottom fastening parts 21 and 22.

Due to this, the distance between the umbilical members CA1 and CA2 becomes larger from the bottom fastening parts 21 and 22 to the top fastening parts 23 and 24, so it is possible to avoid interference between the umbilical members CA1 and CA2 and possible to prevent a drop in lifetime of the umbilical members CA1 and CA2. Further, it is not necessary to lay the umbilical members CA1 and CA2 by bending them into predetermined shapes so as to avoid contact between the umbilical members CA1 and CA2, so laying of the umbilical members CA1 and CA2 is also easy. All of the moving parts CA12 and CA22 of the umbilical members CA1 and CA2 are arranged at the right side surface of the robot 100, so the lengths of the umbilical members CA1 and CA2 can be shortened. The first umbilical members CA1 and the second umbilical members CA2 are laid without overlapping in the left-right direction, so the amounts by which the umbilical members CA1 and CA2 stick out to the right can be kept down.

(2) In the reference posture, the bottom fastening parts 21 and 22 are arranged across the first axial line La and in close proximity to each other, so the first umbilical members CA1 and the second umbilical members CA2 are distributed to the front and back from the bottom fastening parts 21 and 22 to the top fastening parts 23 and 24 to thereby form a V-shape when seen from the side surface. In the space between the top fastening parts 23 and 24, the second distribution board 32 can be arranged.

(3) The second distribution board 32 is arranged between the top fastening parts 23 and 24, so unlike the distribution board 132 of FIG. 1D, the second distribution board 32 is not arranged sticking out to the side of the robot 100. For this reason, the distance from the top fastening part 24 to the second distribution board 32 becomes shorter and the lengths of the second umbilical members CA2 can be made shorter. Due to this, the loss of current and fluid which flow through the second umbilical members CA2 can be reduced.

(4) The first distribution board 31 is arranged in front of the second distribution board 32, so the distance from the top fastening parts 23 of the first umbilical members CA1 to the first distribution board 31 becomes shorter and the lengths of the first umbilical members CA1 can similarly be made shorter.

(5) The distribution boards 31 and 32 are arranged at the base end of the top arm 104, so laying cables and hoses to the end effector 130 at the front end of the top arm 104 is easy.

(6) At the reference posture, the top fastening parts 23 and 24 and distribution boards 31 and 32 are positioned below the top end face TP of the top arm 104, that is, below the topmost part of the top arm 104, so the height of the robot as a whole, including the umbilical members CA1 and CA2, can be kept low. Since parts do not stick out above the top end surface TP of the top arm 104, it is possible to mount some sort of optional part at any position of the top end face TP.

Figure 9:
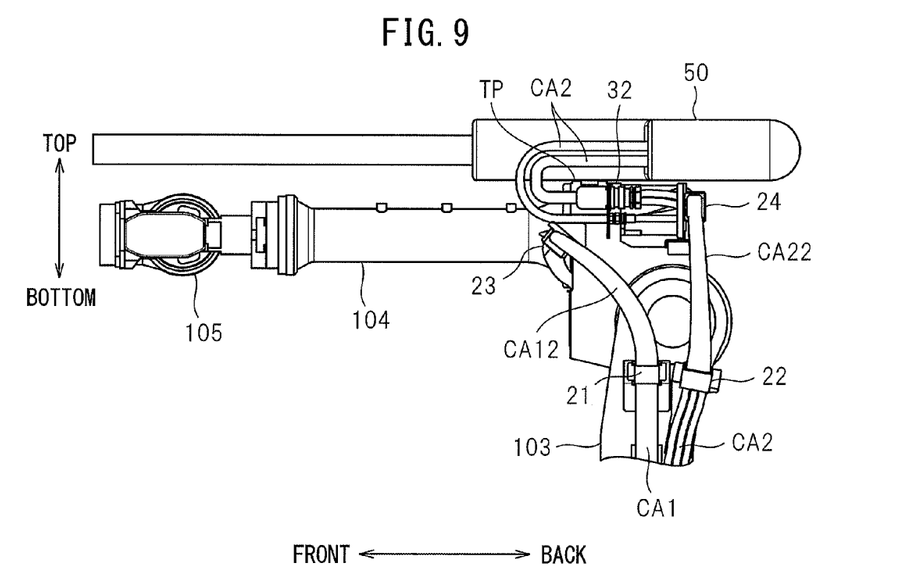
FIG. 9 is a right side view which shows an example of attachment of an umbilical member guide device to a top surface of the top arm.

FIG. 9 is an example of attachment, as an attached component, of an umbilical member guide device 50 which guides the second umbilical members CA2 along the top arm 104. In this example, the umbilical member guide device 50 is attached to the top surface TP of the arm support part 11 of the casing 10. In this case, at the reference posture, the top fastening part 24 of the second umbilical members CA2 and the second distribution board 32 are positioned above the top fastening part 23 of the first umbilical members CA1, so the second umbilical members CA2 can be laid running above the top fastening part 23. The lengths of the second umbilical members CA2 from the second distribution board 32 to the umbilical member guide device 50 can be shortened.

Modifications

In the above embodiment, although the mode of attaching the umbilical member attachment device using the bottom arm 103 and top arm 104 which rotate relative to each other about the axis of rotation L3 and which are provided along the first axial line La and second axial line Lb which perpendicularly intersect the axial line L3 as the first member and second member is explained, the first member and second member are not limited to the configuration explained above. The configurations of the bottom fastening part 21 (first umbilical member-use first fastening part) and the top fastening part 23 (first umbilical member-use second fastening part) which fasten one ends and another ends of the moving parts CA12 of the first umbilical members CA1 respectively to the bottom arm 103 and top arm 104 are not limited to those explained above. The configurations of the bottom fastening part 22 (second umbilical member-use first fastening part) and the top fastening part 24 (second umbilical member-use second fastening part) which fasten one ends and another ends of the moving parts CA22 of the second umbilical members CA2 respectively to the bottom arm 103 and top arm 104 are not limited to those explained above.

In the above embodiment, although the bottom fastening parts 21 and 22 and the top fastening parts 23 and 24 are arranged offset in position from each other on the surface at one end side of the axial line CL3 so the first umbilical members CA1 and the second umbilical members CA2 do not cross, the arrangement of the fastening parts 21 to 24 is not limited to the one explained above. In particular, at the reference posture of the robot 100, if arranging the top fastening parts 23 and 24 across the first axial line La so that the distance between the top fastening parts 23 and 24 becomes greater than the distance between the bottom fastening parts 21 and 22, and arranging the second distribution board 32 between the top fastening parts 23 and 24, the fastening parts 21 to 24 may be arranged in any way. In the above embodiment, although the first distribution board 31 (first umbilical member-use distribution board) and the second distribution board 32 (second umbilical member-use distribution board) are attached to the top arm 104 and the cable CA1 and CA2 are connected to these distribution boards 31 and 32, it is also possible to attach other devices (for example, valve members, etc.) instead of the distribution boards 31 and 32.

The above embodiments and one or more of the modifications can be freely combined.

According to the present invention, the distance between the first umbilical member and the second umbilical member is increased from the first fastening part to the second fastening part, so interference between umbilical members is prevented. Therefore, the trouble of bending the umbilical members into predetermined shapes so as to prevent the interference between the umbilical members can be eliminated and umbilical members can be easily laid.

Above, the present invention was explained with reference to preferred embodiments, but the fact that various corrections and changes may be made without departing from the scope of disclosure of the claims explained later will be obvious to a person skilled in the art.

The invention claimed is:

1. An umbilical member attachment device for attaching a plurality of umbilical members to a robot, the robot having a first member and a second member which rotate relative to each other about an axis of rotation, the first member and the second member being respectively provided along a first axial line and a second axial line which perpendicularly intersect, the plurality of umbilical members including a first umbilical member and a second umbilical member, each of the first umbilical member and the second umbilical member having a moving part movable between the first member and the second member, the umbilical member attachment device comprising:
a first umbilical member first fastening part fastening one end of the moving part of the first umbilical member to the first member;
a first umbilical member second fastening part fastening another end of the moving part of the first umbilical member to the second member;
a second umbilical member first fastening part fastening one end of the moving part of the second umbilical member to the first member; and
a second umbilical member second fastening part fastening another end of the moving part of the second umbilical member to the second member, wherein
the second umbilical member-second fastening part is arranged at a base end of the second member, while the first umbilical member first fastening part, the first umbilical member second fastening part, the second umbilical member first fastening part, and the second umbilical member second fastening part are respectively arranged offset in position from each other on a surface of one end side of robot with respect to the axis of rotation so that the first umbilical member and the second umbilical member respectively stick out to one end side in a direction along the axis of rotation during a rotation of the second member relative to the first member and do not cross each other,
when the robot is at a reference posture where the first axial line and the second axial line perpendicularly intersect, the first umbilical member first fastening part and the second umbilical member first fastening part are arranged in proximity to each other across the first axial line, while the first umbilical member second fastening part and the second umbilical member second fastening part are arranged across the first axial line so that a distance between the first umbilical member second fastening part and the second umbilical member second fastening part is broader than a distance between the first umbilical member first fastening part and the second umbilical member first fastening part, and the umbilical member attachment device further comprising a connection device including an electrical connector to which an end of the second umbilical member extending from the second umbilical member second fastening part is electrically connected or a coupling to which an end of a hose is connected, the connection device being attached to the robot in a position between the first umbilical member second fastening part and the second umbilical member second fastening part.

2. The umbilical member attachment device according to claim 1, wherein the first member is a bottom arm swinging in a front-back direction, the second member is a top arm supported rotatably at a top end of the bottom arm and swinging in a top-bottom direction, and the top arm comprises a wrist part at a front end thereof.

3. The umbilical member attachment device according to claim 2, wherein the bottom arm and the top arm respectively extend toward a vertical direction and a horizontal direction when the robot is in the reference posture, and the first umbilical member second fastening part, the second umbilical member second fastening part, and the device are positioned lower than a topmost part of the top arm at this reference posture.

4. The umbilical member attachment device according to claim 3, wherein when the robot is at the reference posture, the second umbilical member second fastening part and the device are positioned higher than the first umbilical member second fastening part.

5. An umbilical member attachment device for attaching a plurality of umbilical members to a robot, the robot having a first member and a second member which rotate relative to each other about an axis of rotation, the first member and the second member being respectively provided along a first axial line and a second axial line which perpendicularly intersect the axis of rotation, the plurality of umbilical members including a first umbilical member and a second umbilical member, each of the first umbilical member and the second umbilical member having a moving part movable between the first member and the second member, the umbilical member attachment device comprising:

a first umbilical member first fastening part fastening one end of the moving part of the first umbilical member to the first member;

a first umbilical member second fastening part fastening another end of the moving part of the first umbilical member to the second member;

a second umbilical member first fastening part fastening one end of the moving part of the second umbilical member to the first member; and a second umbilical member second fastening part fastening another end of the moving part of the second umbilical member to the second member, wherein the second umbilical member second fastening part is arranged at a base end of the second member, while the first umbilical member first fastening part, the first umbilical member second fastening part, the second umbilical member first fastening part, and the second umbilical member second fastening part are respectively arranged offset in position from each other on a surface of one end side of the robot with respect to the axis of rotation so that the first umbilical member and the second umbilical member respectively stick out in a direction along the axis of rotation during a rotation of the second member relative to the first member and do not cross each other, when the robot is at a reference posture where the first axial line and the second axial line perpendicularly intersect, the first umbilical member first fastening part and the second umbilical member first fastening part are arranged in proximity to each other across the first axial line, while the first umbilical member second fastening part and the second umbilical member second fastening part are arranged across the first axial line so that a distance between the first umbilical member second fastening part and the second umbilical member second fastening part becomes broader than a distance between the first umbilical member first fastening part and the second umbilical member first fastening part, the umbilical member attachment device further comprises a device to which an end of the second umbilical member extending from the second umbilical member second fastening part are connected, between the first umbilical member second fastening part and the second umbilical member second fastening part, the device is a second umbilical member distribution board, and the umbilical member attachment device further comprises a first umbilical member distribution board to which an end of the first umbilical member extending from the first umbilical member second fastening part are connected, at a front side of the second member relative to the second umbilical member distribution board.

6. The umbilical member attachment device according to claim 5, wherein the first member is a bottom arm swinging in a front-back direction, the second member is a top arm supported rotatably at a top end of the bottom arm and swinging in a top-bottom direction, and the top arm comprises a wrist part at a front end thereof.

7. The umbilical member attachment device according to claim 6, wherein the bottom arm and the top arm respectively extend toward a vertical direction and a horizontal direction when the robot is in the reference posture, and the first umbilical member second fastening part, the second umbilical member second fastening part, and the device are positioned lower than a topmost part of the top arm at this reference posture.

8. The umbilical member attachment device according to claim 7, wherein when the robot is at the reference posture, the second umbilical member second fastening part and the device are positioned higher than the first umbilical member second fastening part.

* * * * *